O. KNOERZER.
POTATO SORTER.
APPLICATION FILED SEPT. 12, 1912.
1,090,817.
Patented Mar. 17, 1914.
3 SHEETS—SHEET 3.
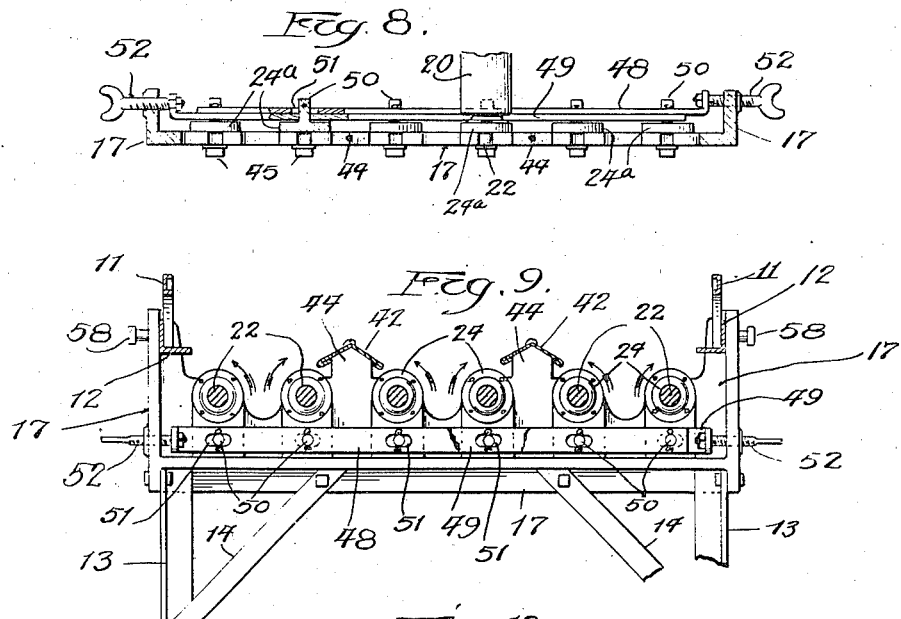
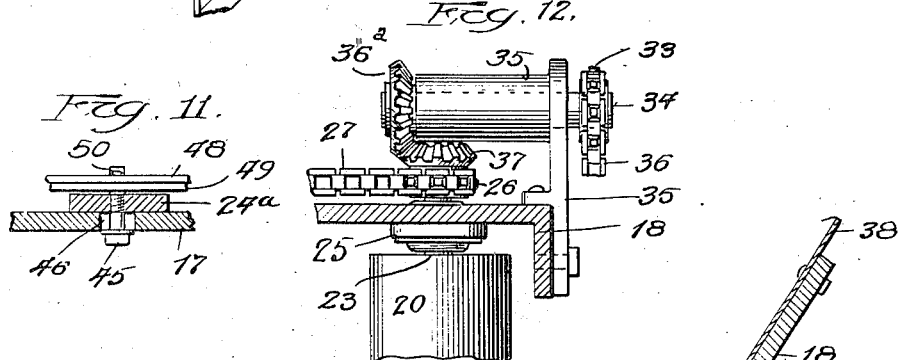
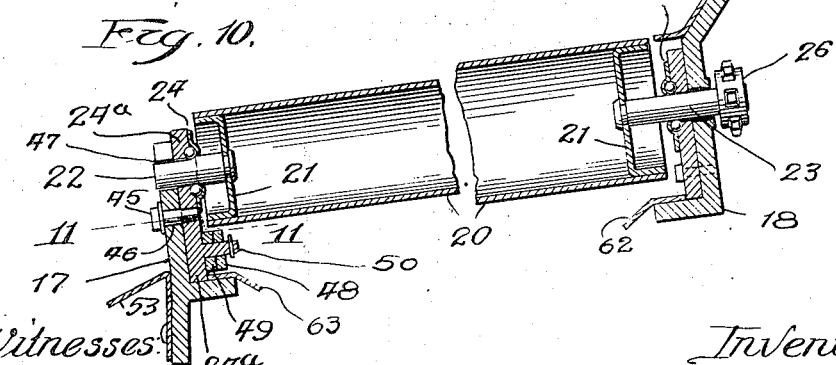
Witnesses
George L. Otto
G. E. Dowle
Inventor:
Otto Knoerzer,
by Charles O. Shervey
his Atty

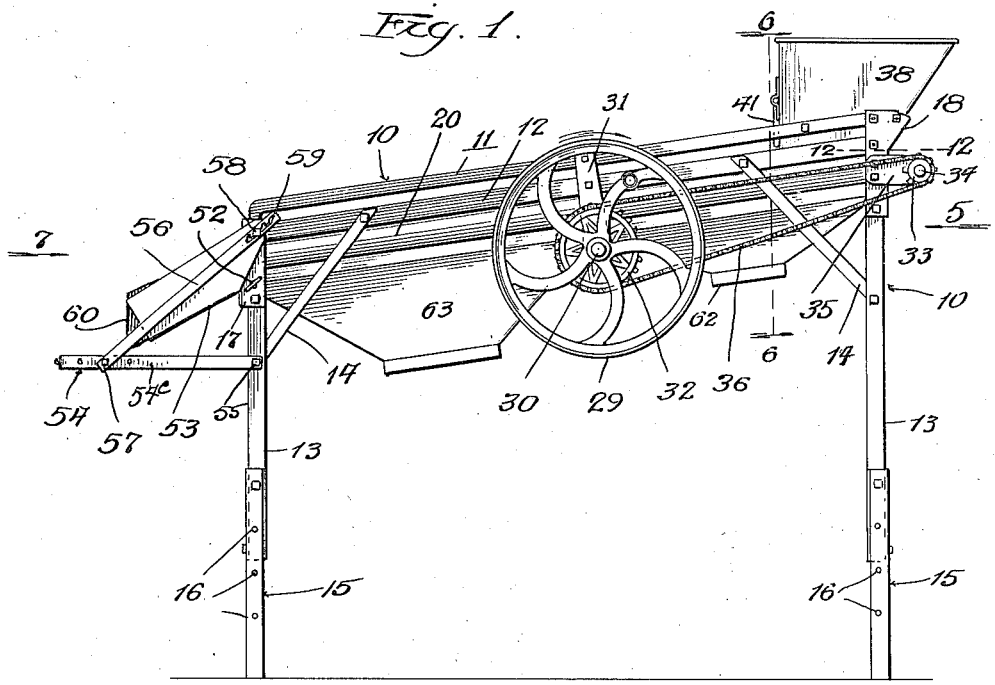

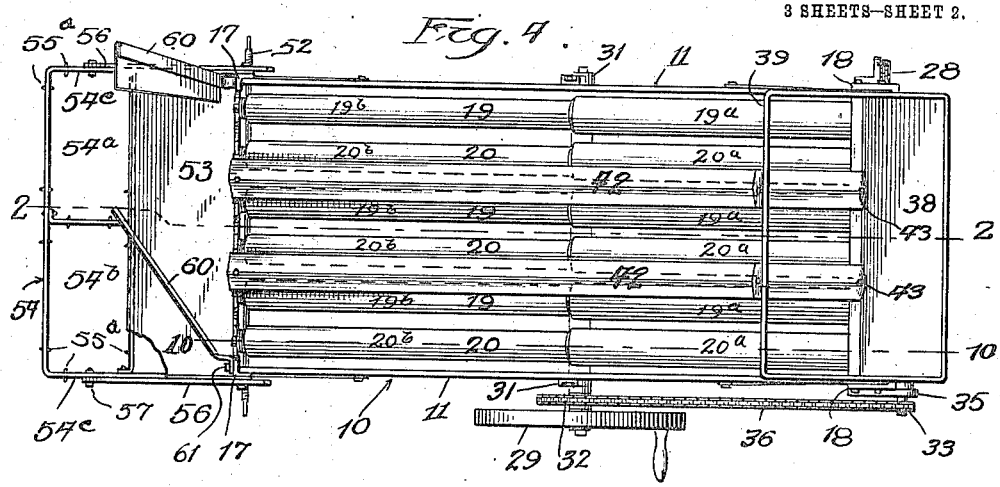

UNITED STATES PATENT OFFICE.

OTTO KNOERZER, OF HAMMOND, INDIANA, ASSIGNOR TO CHAMPION POTATO MACHINERY COMPANY, OF HAMMOND, INDIANA, A CORPORATION OF INDIANA.

POTATO-SORTER.

1,090,817.  Specification of Letters Patent.  Patented Mar. 17, 1914.

Application filed September 12, 1912. Serial No. 719,917.

*To all whom it may concern:*

Be it known that I, OTTO KNOERZER, a citizen of the United States, residing at Hammond, in the county of Lake and State of Indiana, have invented new and useful Improvements in Potato-Sorters, of which the following is a specification.

This invention relates to potato sorters, and its main object is to provide a simple apparatus by means of which the large marketable potatoes and seed potatoes may be separated from each other and from the smaller and imperfect ones.

Another object is to provide a simple and practical machine for this purpose, capable of being driven by hand or by power.

Other objects and advantages will be found in the course of this specification, and with all of said objects and advantages in view, the invention consists in the several novel features hereinafter set forth and claimed.

The invention is clearly illustrated in the drawings furnished herewith, in which:

Figure 1 is a side elevation of a potato sorter embodying one form of my present invention, Fig. 2 is a longitudinal section thereof taken on the line 2—2 of Fig. 4, Fig. 3 is a detail side view of a fragment of a bar for supporting a sack holding frame which forms part of this invention, Fig. 4 is a plan of the device, Fig. 5 is an end view looking in the direction of the arrow 5, in Fig. 1, Fig. 6 is a vertical section taken on the line 6—6 of Fig. 1, Fig. 7 is an end view looking in the direction of the arrow 7 in Fig. 1, Fig. 8 is a detail plan, partly in section, of a certain roll carrying frame and adjustment mechanism, a fragment of one of the rolls being shown in the view, Fig. 9 is a vertical cross section taken on the line 9—9 of Fig. 2, Fig. 10 is a detail longitudinal section through one of the rolls and its supports, the line of section being taken at 10—10 in Fig. 4, Fig. 11 is a detail horizontal section taken on the line 11—11 of Fig. 10, and Fig. 12 is a detail horizontal section taken on the line 12—12 of Figs. 1 and 5.

Referring to said drawings, which show one embodiment of the present invention, 10, designates a supporting frame having inclined side bars 11, 12, and upright legs 13, secured to the ends of said inclined side bars and braced by diagonal braces 14. If desired the legs 13, may have extensions 15, bolted or otherwise secured thereto, each extension having a number of suitably spaced bolt holes 16, whereby said extensions may be secured to the legs at any one of several positions to raise or lower the entire frame and operative parts of the machine. Secured to the inclined side bars 11, 12, and legs 13, are end frame members 17, 18, that form the supports for the potato sorting rolls 19, 20, and various other parts of the machine. The rolls 19—20, are arranged in pairs, as seen in Figs. 4 and 6, and slope downwardly from the head or receiving end of the machine to the discharge end thereof; they are spaced apart to permit the escape of material (small enough to fall through the gaps between the rolls), leaving nothing but the large potatoes on the rolls. As shown in Fig. 6, the rolls are preferably hollow in form and their upper ends $19^a$, $20^a$, (Figs. 2 and 4) are larger in diameter than their lower ends $19^b$, $20^b$, thus providing wider spaces between the lower ends of the rolls than at their upper ends, whereby the very small potatoes as well as dirt and debris may escape between the upper ends of the rolls, whereas the medium sized or seed potatoes may escape between the lower ends of the rolls, the larger or merchantable potatoes tailing over the extreme lower ends of the rolls.

Secured to the ends of the rolls are flanged end pieces 21, (see Fig. 10) to which are secured stud shafts 22, 23, journaled in bearings 24, 25, carried upon the end frame members 17, 18. Said bearings are here shown in the form of ball bearings, but it is obvious that any suitable form of anti-friction bearings may be employed for the shafts 22, 23. The ends of the shafts 23, project out through the end frame members 18, and bear sprocket wheels 26, about which is trained a sprocket chain 27, (see Fig. 5) said chain passing over the alternate sprocket wheels and under the intermediate ones, whereby each sprocket wheel and its roll may be rotated in a direction opposite to the direction of rotation of the other sprocket wheel and roll of the pair. A sprocket wheel 28, is journaled upon a bracket secured to the end frame member 18, and acts as an idler around which the chain passes from the first sprocket wheel of the series to the last one. Means are provided in connection with the sprocket chain 27, for driving all of said sprocket wheels and their rolls and in the form shown in the drawings, said means comprises a wheel 29, fast upon a shaft 30, journaled in bearings 31, carried by the side bars 11, 12, a sprocket wheel 32, secured upon said drive shaft 30, a sprocket wheel 33, secured upon a shaft 34, journaled in a bracket 35, a sprocket chain 36, trained around the sprocket wheels 32, 33, and beveled pinions 36ª, 37. The beveled pinion 36ª, is fast upon the end of the shaft 34, and the beveled pinion 37, is fast upon one of the roll shafts 23, which in this case extends beyond its sprocket wheel 26. It is obvious that by rotating the wheel 29, in the direction of the arrow, the rolls will be driven in the directions indicated by the arrows in Figs. 6 and 9.

Secured to the end frame member 18, and to the side bars is a receiving hopper 38, located immediately above the upper or receiving ends of the rolls 19, 20. The forward wall 39, of said hopper is provided with a number of openings or passageways 40, through which the potatoes may escape from the hopper and roll down the inclined rolls and if desired, yokelike retaining members 41, may be hinged to the wall 39, to act as gates at said openings to retard the escape of the potatoes. Immediately above and between the pairs of rolls and extending the full length thereof is a bar 42, which is preferably angle shaped in cross section and acts as a shed to prevent the large potatoes from falling into the spaces at the sides of the rolls located below said bars. The upper end portions of said bars and rolls act to support the larger potatoes in the hopper while permitting the small ones to pass down between the rolls of each pair. In the form shown, said bars 42, are secured to the rear wall of the hopper as at 43, to the lower end portions of the front wall 39, between the openings 40, and to upwardly extending lugs 44, of the end frame member 17. (See Figs. 7 and 9.) It is to be observed that inasmuch as the rolls 19, 20, of each pair rotate in the direction of the arrows (see Fig. 9) any tendency for the rolls to roll the potatoes into the spaces at the sides of the rolls under the bars 42, is prevented by said bars in the hopper as well as beyond the same.

Frequently it is found desirable to vary the space between the rolls of each pair and in order to accomplish this object, I provide adjustment means, under the control of the operator, whereby the rolls of each pair may be moved farther apart or brought closer together. In the form shown in the drawings for accomplishing this object, the bearing blocks 24ª, of the bearings 24, are movable transversely of the machine and rest against the end frame member 17, as seen in Fig. 10. Bolts 45, extend through horizontal slots 46, in said end frame member 17, and are screwed into the bearing blocks 24ª, thereby connecting said bearing blocks to the end frame member and yet permitting a limited amount of endwise movement thereof. The stud shafts 22, are shown as projecting out through the end frame member 17, which is provided with horizontal slots 47, for the reception of the shafts 22, and with upwardly opening notches through which said shafts may be withdrawn or inserted into the slots 47. Two shift bars 48, 49, are employed for shifting the rolls and each shift bar is connected to the alternate bearing blocks 24ª, by means of pins 50, that project from said bearing blocks and enter holes in the shift bars, each pin 50, passing through an elongated hole 51, in one bar and a round hole in the other bar, whereby either bar may be moved transversely of the machine without affecting the bearing blocks having pins lying in the elongated slots of the moving bar. Reference being had to Fig. 9, it will be seen that the elongated holes and round holes in each bar alternate and that the round holes in one bar are opposite the elongated holes in the other bar, so that movement of either bar in either direction will move those rolls connected to it by the pins, the result being that by moving said bars in opposite directions from a central position, the rolls of each pair will be moved farther apart or brought closer together, depending upon which way the shift bars are moved. Movement of the shift bars outward operates to separate the rolls, and movement inward toward the center of the machine operates to bring the rolls closer together. In the form shown, one end of each bar is bent laterally and receives the end of a thumb screw 52, which is threaded in the end frame 17, and turns freely in the end of the shift bar. Preferably the end of the screw is formed with a neck that extends through a hole in the shift bar, and has a nut on its end. By turning said screws in the right directions, the shift bars are moved to vary the position of the rolls.

At the lower or discharge end of the machine, and secured to the sides of the frame, is a downwardly inclined chute 53, that conveys the selected potatoes (after they discharge over the ends of the rolls) to a sack, box or other receptacle, and below said chute 53, is a sack supporting frame 54, which is hinged to the adjacent legs 13, at 55. Said sack supporting frame is preferably divided into two sections 54ª, 54ᵇ, (see Fig. 4) each of which is substantially rectangular in shape and adapted to receive and support a potato sack in open position, prongs 55ª, preferably being provided on the frame 54, upon which the sack may be temporarily fastened. The sack supporting frame is adjustable up and down and held in position by means of a pair of bars 56, secured to the side members 54ᶜ, of the sack supporting frame 54, and connected with the frame of the machine by means of bolts 58, each of which extends through a notched slot 59 in the bar 56, (see Figs. 1 and 3). By shifting the bars 56, with respect to the bolts 58, the sack supporting frame may be raised or lowered to accommodate sacks of different lengths in such manner that the sack may rest upon the floor or platform upon which the machine is standing.

I provide a pair of deflector plates 60, which as shown are pivotally connected at 61, to the end frame member 17, upon horizontal pivots. Said plates act to guide the potatoes that tail over the end of the rolls into either one of the two sections of the sack supporting frame. Said deflectors when in operative position extend from one side of the frame, at the upper end of the chute, to the lower end thereof at a point midway between its sides. Each deflector is capable of being swung up into inoperative position as shown in Figs. 4 and 7, so that by moving one deflector down and the other one up, all of the selected potatoes will be caused to fall into the sack which is supported on one section of the sack carrying frame, or in any receptacle placed under said section of the sack carrying frame.

Below the rolls are secured two discharge hoppers 62, 63, the one 62, lying under that section of the rolls having the narrow space between them, and the hopper 63, lying between that section of the rolls having the wider space between them. Said hoppers receive the small potatoes, dirt, etc.

In the operation of the machine, potatoes are delivered to the receiving hopper 38, either with an ordinary elevator or in any other suitable manner and the wheel 29, is rotated in the direction of the arrow, thereby causing the rolls to rotate in the proper directions. By reason of the inclined rolls and the action caused by the rotation of the rolls, the potatoes are rolled around over the rolls and tumble down the incline, the very small potatoes, dust and debris falling between the narrower slots at the upper ends of the rolls, whereas the medium sized or seed potatoes fall between the wider slots at the lower end of the rolls and the perfect potatoes tail over the discharge end of the rolls, and fall down the chute and into the sack or other receptacle. The operator may readily observe any decayed or otherwise imperfect potatoes as they roll down the incline and may remove such potatoes before they tail over into the sack.

I realize that various alterations and modifications of this device are possible without departing from the spirit of my invention, and I do not therefore desire to limit myself to the exact form of construction shown and described.

I claim as new and desire to secure by Letters Patent:

1. In a potato sorter, the combination of a supporting frame, a plurality of rotary potato sorting rolls, arranged in pairs, and extending in an inclined plane, said rolls being journaled upon said frame, roll driving mechanism including gearing for driving the rolls of each pair in opposite directions, inverted V shaped bars supported upon said frame and extending the full length of said rolls, there being one bar between the adjacent pairs of rolls, and an open bottomed hopper supported on said frame and located above the upper end portions of said rolls and bars, the forward frame wall of said hopper having portions extending down to and secured to said bars, and therebetween having discharge openings above the rolls of each pair for the discharge of potatoes.

2. In a potato sorter, the combination of a supporting frame having end frame members, one of said frame members being formed with upper and lower series of horizontal, elongated slots, the upper slots having transverse portions opening out through the upper edge of the frame member, bearing blocks carried by said slotted end frame member, bolts, one secured in each block and extending through one of the lower slots of said slotted end frame member, two shift bars, each having round and elongated slots formed therein and alternating with each other, the round slots of one bar registering with the elongated slots of the other, pins, one projecting from each bearing block and extending through the registering round and elongated slots, means for moving said shift bars, and inclined rolls, one for each bearing block, said rolls having shafts, the upper ends of which are journaled in one frame member, and the lower ends of which are journaled in said bearing blocks and extend through the upper series of horizontal slots in the slotted frame member, and are capable of removal through the transverse portions of said slots.

In witness whereof, I have hereunto signed my name, at Hammond, Lake county, Indiana, this 7th day of September 1912.

OTTO KNOERZER.

Witnesses:
LEONARD KNOERZER,
C. H. LASATER.